(12) United States Patent
Polkovnikov et al.

(10) Patent No.: US 9,934,069 B2
(45) Date of Patent: Apr. 3, 2018

(54) MANAGING PROVISIONING OF STORAGE RESOURCES

(71) Applicant: EMC Corporation, Hopkinton, MA (US)

(72) Inventors: Alexey Alexandrovich Polkovnikov, St. Pertersburg (RU); Dmitry Nikolayevich Tylik, Westborough, MA (US); Sergey Alexandrovich Alexeev, St. Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 195 days.

(21) Appl. No.: 14/771,743

(22) PCT Filed: Mar. 19, 2013

(86) PCT No.: PCT/IB2013/001089
§ 371 (c)(1),
(2) Date: Aug. 31, 2015

(87) PCT Pub. No.: WO2014/147438
PCT Pub. Date: Sep. 25, 2014

(65) Prior Publication Data
US 2016/0026501 A1    Jan. 28, 2016

(51) Int. Cl.
*G06F 15/16* (2006.01)
*G06F 9/50* (2006.01)
*H04L 12/26* (2006.01)
*H04L 29/08* (2006.01)

(52) U.S. Cl.
CPC ...... *G06F 9/5016* (2013.01); *H04L 29/08072* (2013.01); *H04L 43/16* (2013.01); *H04L 67/1097* (2013.01)

(58) Field of Classification Search
CPC .... H04L 29/08072; H04L 29/06; H04L 43/16
USPC ............... 709/220, 224, 228, 229; 713/171
See application file for complete search history.

(56) References Cited

U.S. PATENT DOCUMENTS

| | | | |
|---|---|---|---|
| 7,636,764 B1 | 12/2009 | Fein et al. | |
| 8,316,237 B1* | 11/2012 | Felsher | H04L 9/0825 380/282 |
| 9,069,599 B2* | 6/2015 | Martinez | G06F 9/455 |
| 9,071,974 B2* | 6/2015 | McKay | H04L 63/02 |
| 9,489,647 B2* | 11/2016 | Martinez | G06Q 10/06 |
| 9,686,236 B2* | 6/2017 | Lukin | H04L 63/02 |
| 2011/0022812 A1 | 1/2011 | van der Linen et al. | |
| 2011/0179132 A1 | 7/2011 | Mayo et al. | |
| 2012/0084445 A1* | 4/2012 | Brock | G06F 9/5077 709/226 |
| 2012/0096165 A1* | 4/2012 | Madduri | G06F 9/5011 709/226 |

(Continued)

FOREIGN PATENT DOCUMENTS

EA    013001 B1    2/2010

*Primary Examiner* — Khanh Dinh
(74) *Attorney, Agent, or Firm* — BainwoodHuang

(57) ABSTRACT

A method is used in managing provisioning of storage resources. An access is provided to a provisioning decision making service configured to derive a storage provisioning decision based on information provided to the provisioning decision making service. Provisioning of storage resources is enabled on a storage system over a communication medium by using the provisioning decision making service.

23 Claims, 4 Drawing Sheets

(56) References Cited

U.S. PATENT DOCUMENTS

2012/0185913 A1* 7/2012 Martinez ............. G06F 9/455
　　　　　　　　　　　　　　　　　　　　　　726/1
2014/0149494 A1* 5/2014 Markley ............. H04L 67/34
　　　　　　　　　　　　　　　　　　　　　　709/203
2016/0306998 A1* 10/2016 Rosenberg ......... H04L 12/1886

* cited by examiner

MANAGING PROVISIONING OF STORAGE RESOURCES

BACKGROUND

This application relates to managing provisioning of storage resources.

DESCRIPTION OF RELATED ART

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems (also referred to as "storage array" or simply "array") may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. Further, the host systems may access a plurality of file systems organized on a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system. For example, software may be executed on the data storage system in connection with performing data storage administration tasks such as for data storage configuration, management, and/or monitoring. Such tasks may include, for example, configuring storage for use with an email application. In connection with the configuration processing, tasks may include allocating storage, specifying the logical and/or physical devices used for the storage allocation, specifying whether the data should be replicated, the particular RAID (Redundant Array of Independent or Inexpensive Disks) level, and the like. With such options in connection with performing the configuration and allocation of storage, a customer may not have the appropriate level of sophistication and knowledge needed. Also, the particular level of knowledge may vary with each user. Additionally, a single user's knowledge level may vary for different applications and/or tasks that the single user may perform.

Some data storage systems include complex arrangements of storage disk arrays, configuration management interfaces, and storage processors. A system administrator faces many choices in making adjustments to the configuration of a data storage system in response to changing conditions, many of them resulting in suboptimal performance. Along these lines, the system administrator may seek advice with regard to provisioning storage resources while running certain applications. Such advice typically follows application best practices that convert storage provisioning needs into a specification of storage resources such as storage type, RAID type, and de-duplication.

A conventional approach to automating storage resource provisioning employs software embedded in a storage system that allows an administrator to provision storage resources based on predefined provisioning best-practices algorithms embedded in the storage system. Such software can employ a scripting language, such as the well-known Lua scripting language, that expresses the application best practices in procedural logic. The administrator may account for changes in application best practices by arranging for adjustments to the software embedded in the storage system to reflect those changes.

SUMMARY OF THE INVENTION

A method is used in managing provisioning of storage resources. An access is provided to a provisioning decision making service configured to derive a storage provisioning decision based on information provided to the provisioning decision making service. Provisioning of storage resources is enabled on a storage system over a communication medium by using the provisioning decision making service.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
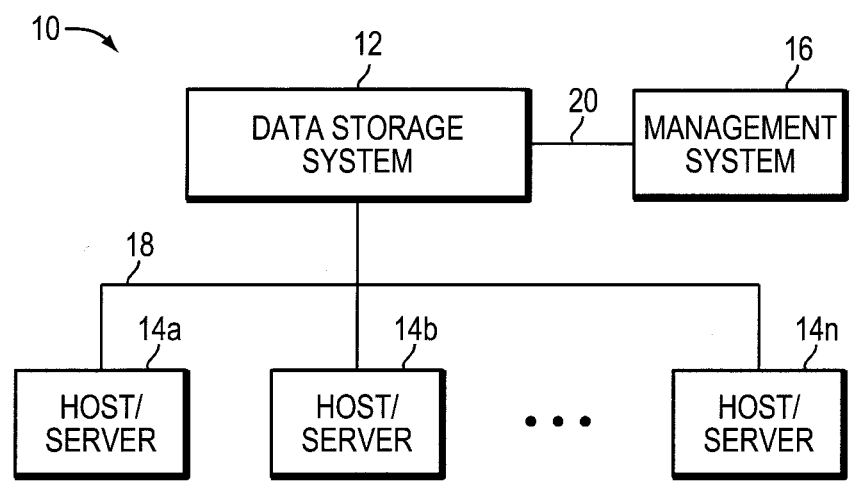
FIG. 1 is an example of an embodiment of a computer system that may utilize the techniques described herein.

Described below is a technique for use in managing provisioning of storage resources, which technique may be used to provide, among other things, providing access to a provisioning decision making service configured to derive a storage provisioning decision based on information provided to the provisioning decision making service, and enabling, using the provisioning decision making service, provisioning of storage resources on a storage system in communication with the provisioning decision making service over a communication medium.

In at least some scenarios, storage provisioning is a process of assigning storage (or "disk space") to applications executing on a data storage system. Storage is provisioned to each of the applications based on the requirements of each of the applications. For example, if a provisioning target is an application such as Microsoft® Exchange, the application may require 100 gigabytes (GB) of space for storing emails, and the required storage space is provisioned from the total amount of storage available in a data storage system.

Typically, requirements of an application include a type of disk, a type of a storage tier, a type of RAID level, performance of the application, an initial storage capacity required by the application, and an amount of storage space required for potential growth of the application data. A storage space is provisioned to an application by allocating a storage pool suitable to the application based on requirements of the application.

Conventionally, a data storage system manages application-aware provisioning of storage resources by providing a storage administrator a set of application specific best practices for provisioning storage resources for different applications such as Microsoft® Exchange, Microsoft® Hyper-V, VMware® Virtual Server, and file sharing applications. An application aware best practice (also referred to herein as "application specific best practice) specifies storage resources topology, size and protection recommendations, translation of application specific parameters (such as number of mailboxes for Microsoft® Exchange) into storage resources parameters (such as disk type, RAID type, deduplication preferences, Fully Automated Storage Tiering (FAST) cache preferences, FAST virtual provisioning preferences) and application aware integration of an application. Application aware best practices are created based on analysis of how applications are used and evaluation of results of testing applications.

Conventionally, application aware provisioning of storage resources uses application aware best practices for making a decision regarding how to provision storage resources for an application. In such a conventional system, application aware best practices used for making storage resources provisioning decisions is embedded inside a storage software executing on a data storage system. Further, in such a conventional system, storage resources may be provisioned based on only one provisioning target which is based on an application. Thus, in such a conventional system, it may be impossible or difficult to provision storage resources for different provisioning targets.

Generally, requirements and configuration preferences for an application change rapidly over time. Thus, in a conventional system, even though a data storage system may include application aware best practices for an application that are integrated into the data storage system, changes in requirements and configuration preferences for the application may require updating application aware best practices embedded in the data storage system which requires upgrading a storage software of the data storage system. Thus, in such a conventional case, an upgrade must be performed on the data storage system in order to upload updated code including the changed requirements.

Further, conventionally, scripting languages in which application aware best practices are expressed are static in nature. Thus, in such a conventional system, the procedural logic in which the application aware best practices are encoded is tied to rigid constructs that require specific software engineering skills in order to implement modifications. Further, in such a conventional system, when using such a scripting language, reuse of knowledge embedded in the provisioning decision-making procedures is limited to function-calling mechanisms. Such a limitation hinders extending and improving this knowledge. It is also complicated to incorporate different logic for provisioning decision-making as the logic may depend on different provisioning targets (e.g., a specific application, SLA, or policy).

Further, in such a conventional system, it is difficult or impossible for a large number of storage systems (e.g., thousands of storage systems) to use the same provisioning decision making service and evaluate results of provisioning decisions for analysis.

By contrast, in at least some implementations in accordance with the technique as described herein, use of a centralized provisioning decision making service for provisioning storage resources based on a provisioning target (e.g. an application) and configuring the provisioning target (e.g., application) on a data storage system based on a storage provisioning decision provided by the provisioning decision making service provides an efficient method for configuring storage resources for a large number of provisioning targets without any detailed knowledge of a script or programming language. Thus, in at least one embodiment of the current technique, a centralized provisioning decision making service is used for provisioning storage resources based on a provisioning target such as an application. Further, in at least one embodiment of the current technique, a data storage system may be configured based on a provisioning target such as best practices of an application either automatically or by a user such that the user neither need to possess knowledge of the best practices of the application nor perform a series of manual operations for provisioning storage space. In at least one embodiment of the current technique, using a provisioning decision making service which resides externally from a storage system enables the storage system to efficiently manage provisioning of storage resources. Further, in at least one embodiment of the current technique, such a provisioning decision making service may be made available to multiple storage systems by using a communication medium such as a cloud such that the multiple storage systems may communicate with the provisioning decision making service through a set of interfaces. Further, in at least one embodiment of the current technique, information such as available storage features, current performance characteristics of storage resources and provisioning goals may be provided to a provisioning decision making service and a set of storage provisioning decisions may be received from the provisioning decision making service which may further be optimized based on the information provided to the service. Further, in at least one embodiment of the current technique, specialized specific software engineering skills required to update provisioning decision-making logic included in a provisioning decision making service may be reduced. A Software-as-a-Service (also referred to herein as "SaaS") is a software delivery mechanism in which a software and associated data are centrally hosted on a communication medium such as a cloud. In at least one embodiment of the current technique, a provisioning decision making service may be deployed in a centralized manner as a SaaS service by deploying the service in a cloud. Alternatively, in at least one embodiment of the current technique, a provisioning decision making service may be deployed locally in a data storage environment.

Further, in at least one embodiment of the current technique, a provisioning decision making service may be deployed for provisioning storage resources not only for a storage system by EMC® Corporation, but also for storage systems provided by third-party storage vendors, Thus, in at least one embodiment of the current technique, logic for providing storage provisioning decisions may be deployed as a service such that clients of such service may register, subscribe and pay for the service based of how such service is used by the clients. Further, in at least one embodiment of the current technique, such provisioning decision making logic may be reused as the logic is detached from a specific storage system.

In at least some implementations in accordance with the technique as described herein, the use of managing provisioning of storage resources can provide one or more of the following advantages: simplifying a process of provisioning storage by using a service external to a data storage system which is based on best practices of applications, lowering cost of maintaining a data storage system by rapidly deploying new application aware best practices upon encountering a change in a system environment such as changes in requirements of an application, changes in disk types, and changes in version of a server by updating an external service used for deciding how to provision storage resources, efficiently managing a data storage system by managing application aware best practices associated with multiple versions of applications without having to upgrade a data storage system software, and improving provisioning decisions made by storage administrators by not only providing the storage administrators with up-to-date recommendations based on a specific application type but also providing recommendations regarding optimal provisioning parameters using generic rule-based logic executed by a provisioning decision making service such as an expert system while representing provisioning information in a manageable and extensible way by using a knowledge base.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. As an example in connection with a medical office application server component that may executed on one or more of the hosts 14a-14n, the data storage configuration tasks may include allocating or provisioning storage for storing patient medical data such as, for example, name, address, insurance information, office visit dates, vaccination records, payments, image files containing x-rays, and the like. Tasks performed in connection with provisioning storage to store patient medical data for the medical office application may include, for example, specifying the devices (logical and/or physical) used to store the data, configuring the data storage devices used such as specifying whether data replication is performed for disaster recovery, and the like. Techniques that may be used in connection with performing data storage provisioning and configuration are described in more detail in following paragraphs in order to provide ease of use to users of the data storage system(s) 12.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for using application aware templates in data storage systems.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices, logical volumes (LVs) or a plurality of file systems. The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

Described in following paragraphs are techniques that may be used to assist users of a data storage system in connection with deciding how to perform data storage services such as related to data storage system configuration, provisioning of data storage, and the like. The techniques describes herein are flexible and allow for implementation of best practices and defaults in an automated fashion which are customized for the particular application, user or customer, and/or underlying data storage system and environment to meet specific customer needs.

Figure 2:
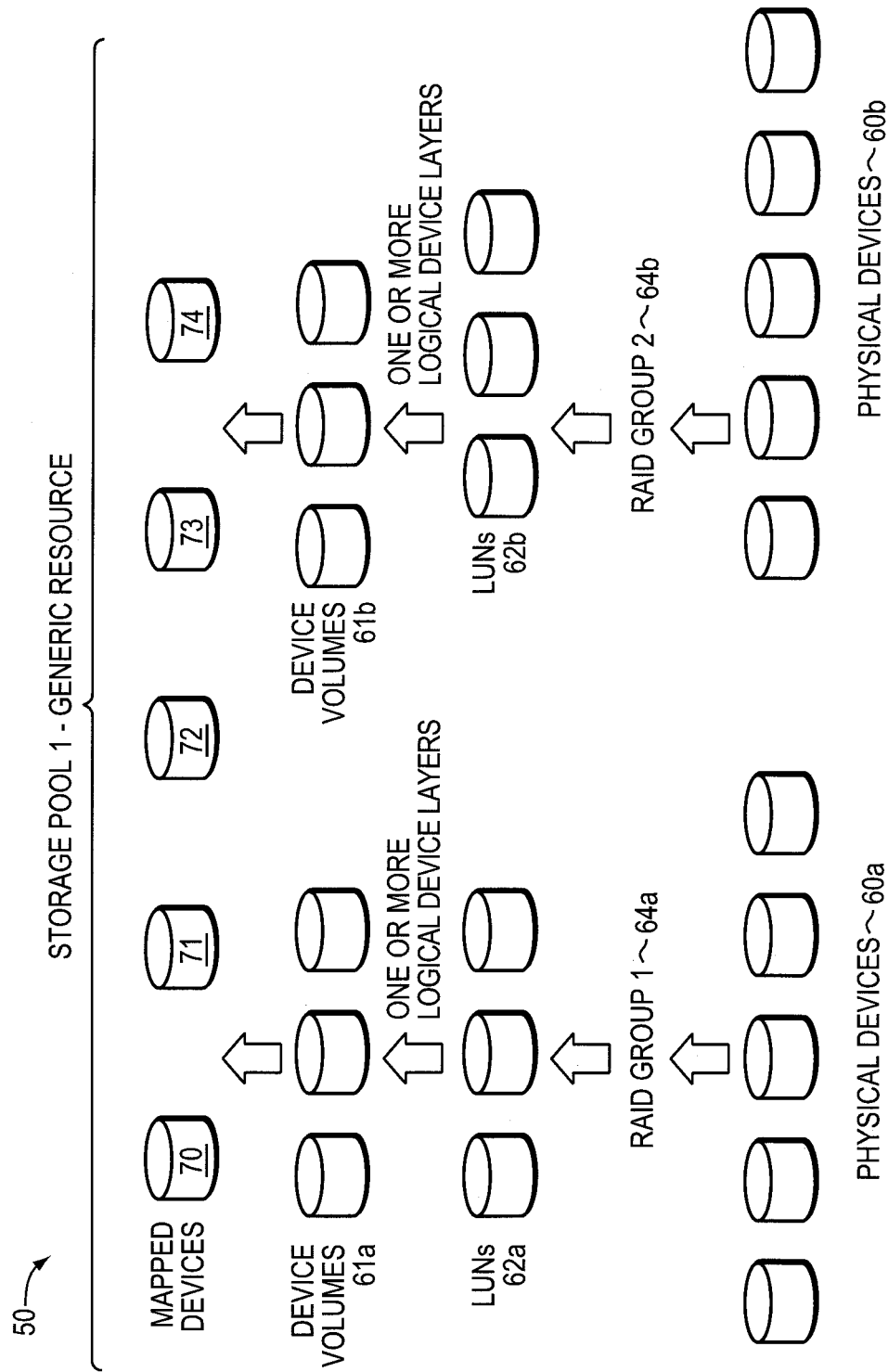
FIG. 2 is an example illustrating storage device layout.

Referring to FIG. 2, shown is an example representing how data storage system best practices may be used to form storage pools. A storage pool may be a collection of disks, which may include disks of different types. Storage pools may further be subdivided into slices; for example a 1 GB slice may be the allocation element for a logical unit. As well, a pool may be use synonymously with a storage tier. That is, both a storage tier and a pool may have storage devices of different performance capabilities and costs. As well, both may contain slices (also referred to as "data slices"). A slice may be considered the smallest element that can be tracked and moved.

A disk may be a physical disk within the storage system. A LUN may be a logical unit number which is an identifier for a Logical Unit. Each slice of data may have a mapping on the location of the physical drive where it starts and ends; a slice may be sliced again.

In at least one embodiment of the current technique, the example 50 illustrates how storage pools may be constructed from groups of physical devices. For example, RAID Group 1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more thin devices 70-74. A thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices such as device volumes 61a-61b, which are logical devices that map logical storage space of the data device to physical storage space on the physical devices 60a-60b. Thus, an access of the logical storage space of the thin device results in either a null pointer (or equivalent) indicating that no corresponding physical storage space has yet been allocated, or results in a reference to a data device which in turn references the underlying physical storage space.

The data storage system best practices may define how to configure or form the generic storage pools, each storage pool having an associated generic storage pool type. Each underlying data storage system may have associated best practices specifying how to configure storage pools formed from physical devices in that particular data storage system. A storage extent may be formed or configured from one or more LUNs 62a-b.

Figure 3:
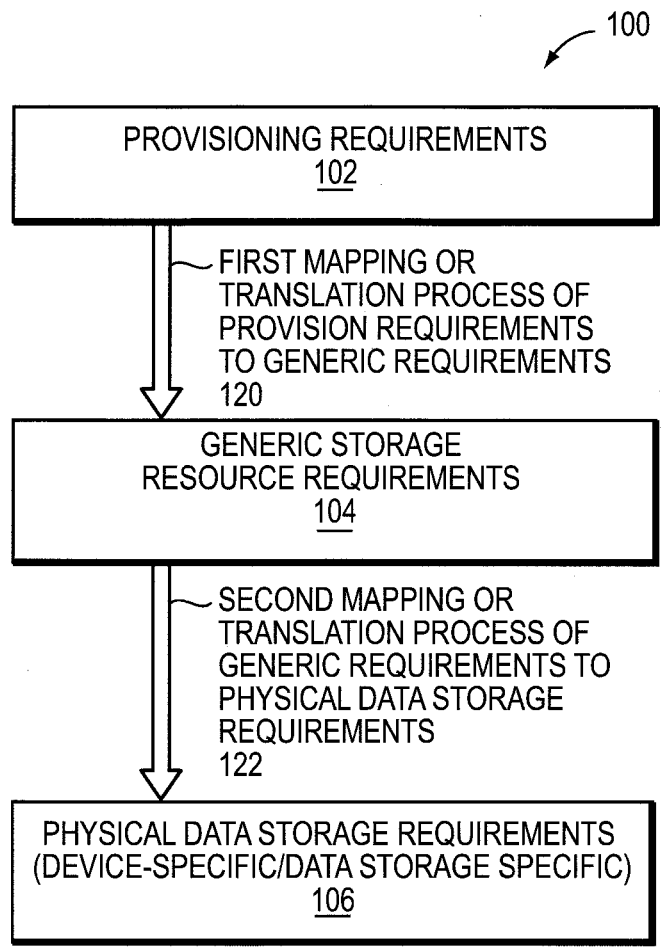
FIGS. 3-4 are block diagrams illustrating in more detail components that may be used in connection with techniques herein.

Referring to FIG. 3, shown is an example representation of the processing that may be performed in an embodiment in accordance with the techniques herein. In at least one embodiment of the current technique, a decision to provision storage resources is determined based on how a provisioning decision making service is implemented. A decision for provisioning storage resources may be based on a provisioning target such as an application, a policy, and a business use case. The example 100 illustrates one type of processing that may be performed in connection with a request to provision storage of a data storage system based on a provisioning target which may be an application. For example, a provisioning request may be made to allocate storage for a number of mailboxes for use by an email application. The example 100 includes provision requirements 102 (such as provision requirement for an application) which may be mapped or translated into generic storage resource requirements 104 in a first mapping or translation stage 120. The generic storage resource requirements 104 may be mapped or translated into physical storage requirements 106 in a second mapping or translation stage 122. The mapping stage 120 may be performed in accordance with application best practices. The steps comprising stage 120 may vary with each application. The mapping stage 122 may be performed in accordance with data storage specific best practices. The steps comprising stage 122 may vary with the particular underlying data storage system.

The data storage specific best practices implemented as part of 122 in an embodiment may be based on experience, know-how, testing, and the like, in connection with provisioning and configuring storage for a particular data storage system. To illustrate, the mapping performed in the first stage 120 may vary with a particular email application, database application, and the like. A different set of processing steps may be performed for each of the foregoing applications in accordance with the application best practices of each application. The mapping performed in the second stage 122 may vary with each data storage system provided by a same vendor or different vendor. For example, EMC Corporation provides the Symmetrix® data storage system and the CLARiiON® data storage system. A different set of processing steps may be performed for each of the foregoing data storage systems in accordance with data storage system specific best practices in connection with the second stage 122.

Each of the different requirements 102, 104 and 106 and the two mapping stages 120 and 122 will now be described in more detail.

The provision requirements 102 may vary with user level and/or particular provisioning target for which the provisioning request is issued. A user may interact with a system utilizing the techniques herein at any one of the user proficiency levels. The provision requirements 102 may vary with each of the different user proficiency levels of interaction that may be provided in an embodiment. Each of the different user levels may provide a different logical view and level of abstraction with respect to a data storage task to be performed for an application executing on one of the hosts. Each of the different user levels may provide a different level of detail with respect to the underlying operations and tasks performed on the data storage system in accordance with different levels of user sophistication and knowledge.

The generic storage resource requirements 104 may be characterized as an expression of the provisioning request in terms of provisioning target-neutral or provisioning target independent data elements and provisioning target independent data element properties. The generic storage requirements 104 refer to data elements that may be used as a common way of expressing the storage requirements for many different provisioning targets. In contrast, the provision requirements 102 may make reference to data elements which are provisioning target-specific such as a number of mailboxes for mail server application. The requirements of 102, such as number of mailboxes, may be translated by 120 into provisioning target independent data elements that may be used as an intermediate expression of storage requirements for a provisioning request.

The generic storage resource requirements 104 may be mapped by the second mapping or translation stage 122 into physical data storage requirements 106. The requirements 106 may vary with the particular type of data storage system (e.g., different data storage system by same or different vendor), customer's configuration and data storage environment (e.g., which data storage system types, number of each, vendor), number and type of devices on each data storage system (e.g., disks, disk or other device characteristics such as capacity, number of disks), and the like. The requirements 106 identify data storage system resources used in connection with implementing or fulfilling a request to provision storage for use by the application. Such resources may include the one or more physical devices from which storage is allocated for use in storing data and any parity information. In an embodiment in which the data storage system is a multiprocessor architecture, a designated processor of the data storage system may be assigned to service I/O requests for one or more portions of the allocated storage.

Providing different levels of application-specific user interaction as described above, where each level may vary with the knowledge required to perform a data storage configuration operation such as a provisioning request for a particular application, is further described, for example, in U.S. Pat. No. 7,523,231, Apr. 21, 2009, Gupta et al. APPLICATION AWARE STORAGE (the '231 patent), U.S. Pat. No. 7,904,652, Mar. 8, 2011, Castelli et al. APPLICATION AWARE USE OF ADDED DEVICES (the '652 patent), and U.S. Pat. No. 7,930,476, Apr. 19, 2011, Castelli et al. APPLICATION AWARE STORAGE RESOURCE PROVISIONING (the '476 patent), which are incorporated by reference herein. The '231 patent describes use of different application-specific user interactions with file systems and/or block storage in order to provide varying levels of automation in accordance with different levels of user knowledge for provisioning. As such, the '231 patent describes an embodiment in which a user may be exposed to varying levels of detail regarding file systems and block storage device configuration, where the level of detail exposed varies with a selected level of user interaction and expected knowledge or skill.

It should be understood that a provisioning decision may be determined based on any provisioning target other than the provisioning target such as an application as described above herein.

Figure 4:
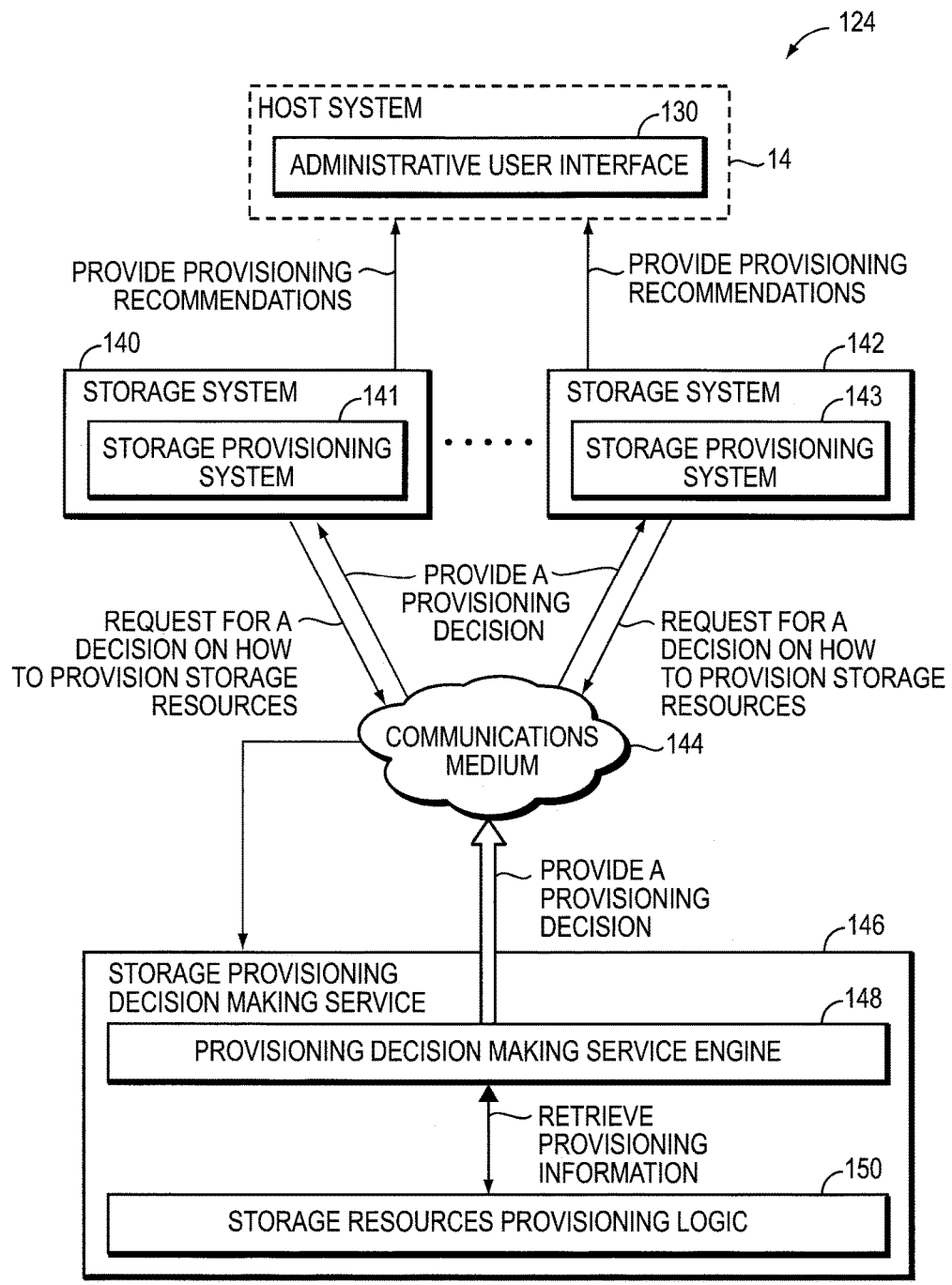

Referring to FIG. 4, shown is a more detailed representation of components that may be included in an embodiment using the techniques described herein. In at least some embodiments of the current technique, storage resources are provisioned for a provisioning target such as an application based on a provisioning decision provided by a provisioning decision making service 146. In at least one embodiment of the current technique, a provisioning decision making service 146 includes a set of rules and policies which are applied for determining a provision decision based on input received from a storage system for provisioning storage resources and the provisioning decision making service 146 is deployed in such a way that the service can be accessed by any storage system which is a part of a communication network that includes the service. For example, if a provisioning target is an application-based target, the application may be one of an email application, a database application, an application which is customized for a particular vertical market, a spreadsheet application, a presentation application, a word processor application, a web server application and virtualization software. Further, in at least one embodiment of the current technique, provisioning decision making service 146 may evaluate performance data from different storage systems and based on the evaluation, analyze whether provisioning decisions provided by the provisioning decision making service 146 can be optimized.

In at least one embodiment of the current technique, the data storage environment 124 comprises a plurality of data storage devices 140, 142 and a communications mechanism 144 for facilitating communication between a data storage system and a system remote of the data storage system. In at least one embodiment of the current technique, the communications mechanism 144 may facilitate communication with a remote device over a network connection using, for example, TCP/IP. For example, the remote device may be a server. Moreover, the data storage devices may be a storage array. A data storage system may send a request to determine how to provision storage resources for an application comprising at least one storage provisioning requirement. In at least one embodiment of the current technique, a user of a host system 14 in communication with a storage system may send a request to determine a provisioning decision by using administrative user interface 130 of the host system 14. Further, a provisioning decision may be determined not only based on a specific application but also based on a specific business use case (such as a billing system). Further, a storage system may use storage provisioning subsystem (e.g., 141, 143) for communicating with provisioning decision making service 146 for determining a provisioning decision indicating how to provision storage resources. For example, a user may request an e-mail application for one hundred users using the management system 16 as described with respect to FIG. 1. It will be appreciated that the provisioning requirement may in this instance be the one hundred users. However, the provisioning requirements may be far more specific and detailed depending on other things such as the user level. For example, the user may be an expert in which case the level of storage provisioning sophistication may be far greater than that of a beginner.

In at least one embodiment of the current technique, provisioning decision making service 146 provides a storage provisioning decision indicating how to provision storage resources based on a provisioning target such as an application in accordance with at least one provisioning requirement. The provisioning decision making service 146 may communicate, by the communications mechanism 144, with a storage environment having the application.

Further, the communications medium 144 connects various components of the data storage environment 124 together to enable these components to exchange information (e.g., requests and responses). In at least one embodiments of the current technique, communications medium 144 may be illustrated as a cloud to indicate that the communications medium 144 is capable of having a variety of different topologies including backbone, hub and spoke, loop, irregular, combinations thereof, and so on. Along these lines, the communications medium 144 may include copper based data communications devices and cabling, fiber optic devices and cabling, wireless devices, combinations thereof, etc. Furthermore, the communications medium 144 is capable of supporting LAN-based communications, SAN based communications, or combinations thereof.

In at least one embodiment, the storage environment 124 may include a cloud environment. For example, the cloud may be any one of the clouds such as a private cloud, community cloud, hybrid cloud or public cloud. Thus, as described above herein, the storage environment 124 may be located locally in a data storage system or remote in the cloud. Further, two or more different customers can connect to a cloud communication medium and use the same provisioning decision making service. Thus, the capability to determine how to provision storage resources may be centralized by either deploying a service including such capability in a data center or using a cloud communication mechanism. Further, a cloud service may either be provided by EMC Corporation or a third party cloud service provider. In such a system, a storage system may communicate with a cloud service in order to access a provisioning decision making service. Further, if the storage environment 124 includes a cloud, a provisioning decision making service may be deployed on a virtual machine. Further, a provisioning decision making service may be deployed locally on a data storage system as a system service.

In at least one embodiment, a cloud service provider may convert heterogeneous storage systems within a data center into one large logical storage array. In at least some embodiments, the current disclosure may enable exposure of logical storage resources and allow enterprise IT departments and cloud service providers to manage heterogeneous storage environments through a simple set of APIs and a set of command-line interfaces (CLI). In at least some embodiments, the current disclosure may enable an enterprise to adopt hybrid management models in environments where storage infrastructure resides in enterprise data centers, but is also hosted by a service provider or a public cloud. In at least some embodiments, the current disclosure may enable an enterprise to manage hybrid deployments as a single storage array.

Thus, in at least one embodiment of the current technique, removing the logic for provisioning decision making from a data storage system and adding such logic to a service external to the data storage system which is deployed in a cloud communications environment enables the provisioning decision making logic to evolve independently and separately from a storage software of the data storage system. Thus, the current technique enables different types of storage systems to provision storage resources based on a specific provisioning target. Further, performing provisioning decision making as part of a separate service which is deployed within a cloud enables update of the storage provisioning decision making logic without having to update storage software of a storage system.

In at least one embodiment of the current technique, a request for determining a storage provisioning decision and a response corresponding to such request may be implemented in a structured format such as XML (Extensible Markup Language) which enables a storage system to either automatically perform the storage provisioning decision requested by a storage system or provide the storage provisioning decision to a user through a user interface.

Further, in at least one embodiment of the current technique, a request received by provisioning decision making service 146 for determining a decision regarding how to provision storage resources may include information such as attributes of storage and provisioning targets such as whether to provision for a specific application, optimal speed, availability or security. Further, provisioning decision making service 146 is able to use different decision making mechanisms based on information provided by a request for determining a decision regarding how to provision storage resources. Further, in at least one embodiment of the current technique, provisioning decision making service 146 may adaptively learn from provisioning decisions determined previously and based on information learned from the previous provisioning decisions may improve provisioning decision making capabilities. Further, in order to adaptively learn from previous provisioning decisions provided to storage systems, information regarding the previous provisioning decisions may be gathered and analyzed. Further, in at least one embodiment of the current technique, a large number of storage systems may be able to leverage various storage technologies such as storage tiering, caching, deduplication, and replication by including a logic within provisioning decision making service 146 in a centralized manner.

Thus, in at least one embodiment of the current technique, provisioning decision making service 146 may store provisioning decisions previously determined for storage systems and information regarding performance of the storage systems after executing the provisioning decisions in order to analyze whether provisioning targets have been met successfully thereby improving decision making capabilities of provisioning decision making service 146. Further, provisioning decision making service 146 may include a capability to provide provisioning decisions to storage systems from different vendors in a unified yet efficient manner.

Further, in at least one embodiment of the current technique, provisioning decision making service 146 may provide different subsets of decision making logic to different sets of users. For example, an open access may be provided to universities in order to allow students to learn algorithms. Such open access may enable a storage system to support applications that may enable a storage administrator to configure storage systems from vendors other than EMC Corporation by using recommendations provided by provisioning decision making service 146 provided by EMC Corporation.

In at least one embodiment of the current technique, provisioning decision making service 146 may include provisioning decision making service engine 148 which is invoked for determining a provisioning decision. Provisioning decision making service engine 148 may work in conjunction with storage resources provisioning logic 150 which may include a knowledge base including provisioning rules, facts, and constructs that may be required for logical inference of a provisioning decision. Provisioning decision making service engine 148 may be used to enable storage resources provisioning logic 150 to operate in a cloud-based environment. In at least one embodiment of the current technique, an expert based system engine may be used as a mechanism for providing provisioning decisions by storage provisioning decision making service 146.

In at least one embodiment of the current technique, provisioning decision making service 146 receives requests from a storage system and/or an application for determining a provisioning decision for the storage system and/or application. In at least one embodiment of the current technique, provisioning decision making service 146 includes an expert system logic engine which receives requests from a storage system, translates the requests into input data for the expert system logic engine, invokes the expert system logic engine to determine provisioning decisions and provides results to the storage system.

In at least one embodiment of the current technique, an expert system logic engine matches facts provided by a request for determining a provisioning decision with patterns and determines a set of rules from a provisioning information knowledge base that may be applicable to the facts. The expert system logic engine then executes the applicable rules.

In at least one embodiment of the current technique, a provisioning information knowledge base includes a set of rules required for by the expert system logic engine for analysis. Thus, the provisioning information knowledge base includes a set of rules and data definitions patters that may be used by the expert system logic engine in order to determine a provisioning decision.

However, it should be noted that provisioning decision making service engine 148 may include any known system other than an expert-based system that may analyze a set of rules for determining a provisioning decision. Further, it should be noted that in a data storage environment, multiple provisioning decision making services 146 may provide provisioning decisions to multiple storage systems concurrently.

In at least one embodiment of the current technique, a user may submit values of a set of provisioning operation targets using a storage administration interface 130 to a storage processing device (e.g., 140, 142). The provisioning decision making service 146 uses these values to form a set of facts within an expert system deployed as provisioning decision making service engine 148 that works in conjunction with storage resources provisioning logic 150 (such as a knowledge base) having a set of logical rules and an inference engine. The storage processing device (e.g., 141, 143) then inputs these facts and logical rules into the inference engine which is configured to fire logical rules having preconditions that match the facts. The actions of these logical rules then provide content for the provisioning of the storage resources, which the storage administration interface displays to the user. Alternatively, the storage processing device may receive a provisioning decision from provisioning decision making service 146 to automatically provision storage resources based on the provisioning decision.

Further, provisioning decision making service 146 allows for simple logical statements to express rules defining the knowledge embedded in provisioning decision-making algorithms. The service 146 collects such logical statements in a knowledge base from where adjustments to the logical statements can be made with ease in a simple language. Further, the logical statements in the knowledge base are reused by the different storage platforms that may all benefit from the knowledge embedded in the logical statements. Thus, the provisioning knowledge is platform-independent.

In at least one embodiment of the current technique, a storage system (e.g., 140, 142) receives, from a user (e.g., 14, 130), a request, to determine how to provision storage resources for the storage system, i.e., input from user, the request including values of a set of provisioning target parameters indicative of provisioning operation requirements. The storage system produces, from the values of the set of provisioning targets parameters, a set of facts, each fact of the set of facts being configured as input, into provisioning decision making service 146 that may include storage resource provisioning logic 150 (such as a knowledge base) and an inference engine such as provisioning decision making service engine 148 (e.g., an expert-based system engine), the storage resource provisioning logic 150 being configured to store a set of logical rules, the inference engine being configured to derive a storage provisioning decision from the set of facts and the storage resource provisioning logic 150 by firing particular logical rules of the set of logical rules. The set of logical rules and the set of facts are provided to the inference engine to produce a storage resource provisioning decision. The storage resource provisioning decision is then provided to the user, or used by the storage system for a subsequent automatic provisioning operation.

For example, a request from a user, i.e., the input of the values of the provisioning target parameters, may be input by the user using administrative user interface 130. In at least some embodiments, however, the user may send a request to storage system (e.g., 140, 142) from a remote location.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of managing provisioning of storage resources, the method comprising:
   providing access to a provisioning decision making service configured to derive a storage provisioning decision based on information provided to the provisioning decision making service; and
   enabling, using the provisioning decision making service, provisioning of storage resources on a storage system in communication with the provisioning decision making service over a communication medium, wherein enabling provisioning of storage resources on the storage system using the provisioning decision making service includes:
      mapping provisioning requirements of an application to generic storage resource requirements, wherein the provisioning requirements of the application refer to data elements that are specific to the application, and wherein the generic storage requirements are application independent, and
      mapping the generic storage resource requirements to physical data storage requirements that identify specific storage system resources within the storage system that are to be provisioned to the application, wherein the identified data storage system resources are used to fulfill a request to provision storage for use by the application.

2. The method of claim 1, wherein access to the provisioning decision making service is provided by a set of interfaces.

3. The method of claim 1, wherein the communication medium includes a cloud communication medium.

4. The method of claim 3, wherein the cloud communication medium includes a private cloud, a public cloud, a hybrid cloud, and a community cloud.

5. The method of claim 1, further comprising;
   deriving the storage provisioning decision based on a provisioning target.

6. The method of claim 4, wherein the provisioning target includes an application, a policy and a use case.

7. The method of claim 1, wherein the provisioning decision making service is located remote from the storage system.

8. The method of claim 1, further comprising:
   performing automatically provisioning of storage resources based on the storage provisioning decision provided by the provisioning decision making service.

9. The method of claim 1, wherein the provisioning decision making service is deployed as a centralized service independent of storage software of the storage system.

10. The method of claim 1, wherein the provisioning decision making service is deployed in the storage system independent of storage software of the storage system.

11. A system of managing provisioning of storage resources, the system comprising:
    first logic providing access to a provisioning decision making service configured to derive a storage provisioning decision based on information provided to the provisioning decision making service; and
    second logic enabling, using the provisioning decision making service, provisioning of storage resources on a storage system in communication with the provisioning decision making service over a communication medium, wherein provisioning of storage resources on the storage system using the provisioning decision making service is enabled at least in part by:
       provisioning requirements of an application being mapped to generic storage resource requirements, wherein the provisioning requirements of the application refer to data elements that are specific to the application, and wherein the generic storage requirements are application independent, and
       the generic storage resource requirements being mapped to physical data storage requirements that identify specific storage system resources within the storage system that are to be provisioned to the application, wherein the identified data storage system resources are used to fulfill a request to provision storage for use by the application.

12. The system of claim 11, wherein access to the provisioning decision making service is provided by a set of interfaces.

13. The system of claim 11, wherein the communication medium includes a cloud communication medium.

14. The system of claim 13, wherein the cloud communication medium includes a private cloud, a public cloud, a hybrid cloud, and a community cloud.

15. The system of claim 11, further comprising;
    third logic deriving the storage provisioning decision based on a provisioning target.

16. The system of claim 14, wherein the provisioning target includes an application, a policy and a use case.

17. The system of claim 11, wherein the provisioning decision making service is located remote from the storage system.

18. The system of claim 11, further comprising:
    third logic performing automatically provisioning of storage resources based on the storage provisioning decision provided by the provisioning decision making service.

19. The system of claim 11, wherein the provisioning decision making service is deployed as a centralized service independent of storage software of the storage system.

20. The system of claim 11, wherein the provisioning decision making service is deployed in the storage system independent of storage software of the storage system.

21. The method of claim 1, wherein the application comprises an electronic mail application;
    wherein the data elements that are specific to the application comprise a total number of mailboxes for the electronic mail application; and
    wherein the specific storage system resources within the storage system that are to be provisioned to the application comprise physical disks from which storage is allocated for use by the application for storing data and associated parity information.

22. The method of claim 21, wherein enabling provisioning of storage resources on the storage system using the provisioning decision making service further includes:
    storing provisioning decisions previously determined for a plurality of storage systems, and information regarding performance of the storage systems after executing the provisioning decisions; and
    analyzing whether provisioning targets have been met successfully by the storage systems, in order to improve decision making capabilities of the provisioning decision making service.

23. The method of claim 22, wherein enabling provisioning of storage resources on the storage system using the provisioning decision making service further includes:
    receiving, by the provisioning decision making service, at least one request for determining the provisioning decision;
    translating the request into input data for an expert system logic engine; and
    invoking the expert system logic engine to determine the storage provisioning decision.

* * * * *